Patented May 15, 1951

2,552,534

UNITED STATES PATENT OFFICE 2,552,534

PROCESSES FOR BREAKING PETROLEUM EMULSIONS

Melvin De Groote, University City, Mo., assignor to Petrolite Corporation, Ltd., Wilmington, Del., a corporation of Delaware No Drawing. Application March 4, 1950, Serial No. 147,759

8 Claims. (Cl. 252—344)

This invention relates to processes or procedures particularly adapted for preventing, breaking or resolving emulsions of the water-in-oil type, and particularly petroleum emulsions.

The present invention is a continuation-in-part of my co-pending application Serial No. 107,381, filed July 28, 1949.

Complementary to the above aspect of the invention herein disclosed, is my companion invention concerned with the new chemical products or compounds used as the demulsifying agents in said aforementioned processes or procedures, as well as the application of such chemical products, compounds, or the like, in various other arts and industries, along with the method for manufacturing said new chemical products or compounds which are of outstanding value in demulsification. See my co-pending application Serial No. 147,760, filed March 4, 1950.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

In my co-pending applications, Serial Nos. 104,801, 104,802, 104,803 and 104,804, all filed July 14, 1949, I have described the breaking of petroleum emulsions by means of certain polyol ethers. Said inventions, or invention, described in the aforementioned co-pending applications may, in the broadest aspect, be considered as being concerned with a process for breaking petroleum emulsions of the water-in-oil type, characterized by subjecting the emulsion to the action of a demulsifier including high molal oxypropylation derivatives of monomeric polyhydric compounds with the proviso that (a) The initial polyhydric reactant be free from any radical having at least 8 uninterrupted carbon atoms;

(b) The initial polyhydric reactant have a molecular weight not over 1200 and at least 4 hydroxyl radicals;

(c) The initial polyhydric reactant be water-soluble and xylene-insoluble;

(d) The oxypropylation end product be water-insoluble and xylene-soluble;

(e) The oxypropylation end product be within the molecular weight range of 2000 to 30,000 on an average statistical basis;

(f) The solubility characteristics of the oxypropylation end product in respect to water and xylene be substantially the result of the oxypropylation step;

(g) The ratio of propylene oxide per hydroxyl in the initial polyhydric reactant be within the range of 7 to 70;

(h) The initial polyhydric reactant represent not more than 12½%, by weight, of the oxypropylation end product on a statistical basis; and (i) The preceding provisos being based on complete reaction involving the propylene oxide and the initial reactant.

My aforementioned co-pending application Serial No. 107,381, filed July 28, 1949, was concerned with a process for breaking petroleum emulsions of the water-in-oil type, characterized by subjecting the emulsion to the action of a demulsifier including high molal oxypropylation derivatives of monomeric polyamino compounds with the proviso that (a) The initial polyamino reactant be free from any radical having at least 8 uninterrupted carbon atoms;

(b) The initial polyamino reactant have a molecular weight of not over 1800 and at least a plurality of reactive hydrogen atoms;

(c) The initial polyamino reactant must be water-soluble;

(d) The oxypropylation end product must be water-insoluble;

(e) The oxypropylation end product be within the molecular weight range of 2000 to 30,000 on an average statistical basis;

(f) The solubility characteristics of the oxypropylation end product in respect to water must be substantially the result of the oxypropylation step;

(g) The ratio of propylene oxide per initial reactive hydrogen atom must be within the range of 7 to 70;

(h) The initial polyamino reactant must represent not more than 20%, by weight, of the oxypropylation end product on a statistical basis;

(i) The preceding provisos are based on the assumption of complete reaction involving the propylene oxide and initial polyamino reactant;

(j) The polyamino reactant must contain at least one basic nitrogen atom; and (k) The nitrogen atoms are linked by a carbon atom chain.

More particularly, the last aforementioned invention was concerned with oxypropylation derivatives of polyamines such as diethylenetetramine, triethylenetetramine, tetraethylenepentamine, etc. In all such polymines there was no interruption of the carbon atom chain uniting amino nitrogen atoms. The present invention is distinguished from the invention of Serial No. 107,381, filed July 28, 1949, in that the instant invention is concerned with oxypropylation products derived from polyamines in which at least one carbon atom chain linking 2 amino nitrogen atoms has been interrupted at least once by an oxygen atom. There is the further proviso, in both instances, that the polyamine be free from any radical having 8 or more uninterrupted carbon atoms. There are a number of well known polyamines which meet the structural requirements enumerated above. Among others are triglycoldiamine (3,6-dioxa-1,8-octanediamine). This diamine has the formula

Another useful diamine of this type is tetraglycoldiamine (3,6,9 - trioxa-1,11-hendecanediamine) of formula

Still another example is

See U. S. Patent No. 2,359,867, dated October 10, 1944, to Martin, and U. S. Patent No. 2,334,782, dated November 23, 1943, to Martin.

Such water-soluble polyamino reactants having at least one oxygen-interrupted carbon atom chain uniting two amino nitrogens and having at least 4 reactive hydrogen atoms (hydrogen atom attached to either nitrogen or oxygen) and being free from any radical having 8 uninterrupted carbon atoms and having at least one basic nitrogen atom, can be obtained by well known methods which have been described in a number of patents. These products have been obtained in various ways. Some of the procedures yield a single chemical compound, others yield a cogeneric mixture. For my purpose a cogeneric mixture is just as satisfactory as a single compound.

Some of the general procedures employed in the manufacture of such amines include the following:

(a) Treat one mole of a polyhydric alcohol such as a glycol, glycerol, polyglycerol, sorbitol, sorbitan, triethanolamine, triisopropanolamine, or the like, with a plurality of moles of a reactive imine, such as ethylene imine, propylene imine, etc.;

(b) Use the same procedure employed in manufacturing polyamines from ethylene dichloride, propylene dichloride, or the like, but replace these halides by dichloroethyl ether, dichloropropyl ether, etc.;

(c) Etherize hydroxylated monoamines, such as triethanolamine or hydroxylated polyamines, so as to produce an oxygen-interrupted linkage of the kind previously described. Attention is particularly directed to U. S. Patents Nos. 2,324,488, dated July 20, 1943, to De Groote et al., and 2,395,400, dated February 26, 1946, to De Groote;

(d) React an alkoxide of a hydroxylated amine with a suitable chlorinated reactant;

(e) Other procedures are described in aforementioned U. S. Patents Nos. 2,334,782, and 2,359,867, to Martin. See also U. S. Patent 2,363,464, dated November 21, 1944, to Senkus; and (f) Another procedure involves the use of a hydroxyalkyl alkylenimine to replace the separate use of ethylene oxide, for example, and ethylene imine. As to the preparation of hydroxyalkyl ethylenimines, see U. S. Patent No. 2,475,068, dated July 5, 1949, to Wilson.

Reference to a "basic nitrogen atom" applies to one which is not attached to a negative group, such as aryl or acyl. If one reacted phenylethylene diamine or acetylethylene diamine with three moles of ethyleneoxide and then etherized the product so as to obtain an oxygen-interrupted linkage, then such compounds would qualify as suitable polyamines for the purpose of this description.

The present invention is intended to include polymers of the kind subsequently described, and particularly, condensation polymers obtained by etherization and the elimination of water. It is not intended, however, to include linear polymers or dimers, or other higher polymeric types obtained, for example, by reaction between a dicarboxy acid, such as adipic acid, and one or more of the polyfunctional polyamines subsequently described.

Briefly stated, the present invention is concerned with breaking petroleum emulsions by means of certain polyol ethers. Such ethers are obtained by oxypropylation. Some of the initial materials which can be subjected to oxypropylation to give the desired polyol ethers have been described previously. The larger numbers of amino reactants to be employed in such oxypropylation step are described subsequently.

The preparation of such oxypropylation derivatives is described hereinafter in detail. Such ethers are obtained by treating a water-soluble polyamino reactant having a plurality of functional groups (hydrogen atoms attached to oxygen or nitrogen so as to be reactive toward an alkylene oxide) with propylene oxide. A plurality of propylene oxide is used in molal proportion to the polyamino reactant so as to convert the initial water-soluble product into an ultimate resultant which is water-insoluble and comes within certain molecular weight limits hereinafter specified.

For instance, the herein described resultants, or more correctly, products of reaction, since they invariably and inevitably represent cogeneric mixtures, rather than a single component, when mixed with distilled water, so as to give a 5% solution, suspend after a fashion during vigorous agitation, but on being allowed to stand in a quiescent stage, immediately separate out so that within a short length of time, for instance, within a few minutes to several hours, all or substantially all the big bulk of material has separated from the aqueous solution or suspension. In fact, in the higher stages of oxypropylation, the materials obtained seem to go into water at room temperature, with considerable difficulty, and if the water happens to be warm, for instance, at a temperature of 50°, 60°, or 70° C., the materials are even less soluble. An example of a product difficult to disperse, even with vigorous shaking, and which, even so, does not stay dispersed, is the resultant obtained by treating one mole of a product derived from tetraethylene pentamine, ethylene oxide and glycide, hereafter identified as Example 17a, with 200 moles of propylene oxide.

Reference as to solubility is in ordinary cold water at approximately room temperature, for instance, 22.5° C., or thereabouts.

In a more formal manner, the present invention is concerned with a process for breaking petroleum emulsions of the water-in-oil type, characterized by subjecting the emulsion to the action of a demulsifier including high molal oxypropylation derivatives of monomeric polyamino compounds with the proviso that (a) The initial polyamino reactant be free from any radical having at least 8 uninterrupted carbon atoms;

(b) The initial polyamino reactant have a molecular weight of not over 10,000 and at least a plurality of reactive hydrogen atoms;

(c) The initial polyamino reactant must be water-soluble;

(d) The oxypropylation end product must be water-insoluble;

(e) The oxypropylation end product be within the molecular weight range of 5,000 to 100,000 on an average statistical basis;

(f) The solubility characteristics of the oxypropylation end product in respect to water must be substantially the result of the oxypropylation step;

(g) The ratio of propylene oxide per initial reactive hydrogen atom must be within the range of 5 to 125;

(h) The initial polyamino reactant must represent not more than 20%, by weight, of the oxypropylation end product on a statistical basis;

(i) The preceding provisos are based on the assumption of complete reaction involving the propylene oxide and initial polyamino reactant;

(j) The polyamino reactant must contain at least one basic nitrogen atom; and (k) At least one carbon atom chain linking two nitrogen atoms is interrupted at least once by an oxygen atom.

For convenience, what is said hereinafter is divided into three parts:

Part 1 is concerned with the description of the polyamino reactants employed, as well as reference to other compounds, products, etc., so there may be a clear line of demarcation between the present invention and what may appear elsewhere;

Part 2 is concerned with the preparation of the oxypropylated derivatives; and

Part 3 is concerned with the use of an oxypropylated derivative as a demulsifier for petroleum emulsions of the water-in-oil type.

PART 1

The polyamino reactants, needless to say, are preferably obtained from commercially available materials. In essence, this means various ethanolamines, various propanolamines, various polyethylene amines, various polypropylene amines, etc. The hydroxylated amines, such as triethanolamine, diethanolamine, tri-isopropanolamine, etc., can be converted into polyamines containing an ether linkage between two amino nitrogen atoms, by heating, particularly in presence of an alkali, such as one-tenth of a percent of caustic soda, which is well known and described in numerous patents, for example, aforementioned De Groote et al. Patent No. 2,324,488.

In many instances, however, the most desirable reactants are obtained from polyethylene amines or similar polyalkylene amines, in which there is not present any alkanol radical which lends itself to the etherization reaction of the kind referred to immediately preceding. Under such circumstances, all that is required is to treat the polyalkylene amine, provided it has one or more reactive hydrogen atoms, with ethylene oxide, propylene oxide, glycide, or the like. The result of such reaction is to give a hydroxylated compound susceptible to etherization in the same manner as previously described. This procedure also is well known and has been described in numerous patents, including aforementioned De Groote Patent No. 2,395,400. In fact, numerous examples in the following table are substantially the same as one in said aforementioned De Groote Patent No. 2,395,400, except that, instead of adding glycerol, glycide is used.

The treatment of amines, either monoamines or polyamines, with an alkylene oxide is well known and described in numerous patent references. At such time that the amine contains one or more basic nitrogen atoms and such atoms have a substantial effect in introducing alkalinity, one need not use any catalyst. Stated another way, the amine itself is its own catalyst for the oxyalkylation reaction. If, however, the basicity is too low, the usual alkaline catalyst, i. e., sodium methylate, caustic soda, or caustic potash, can be added in the range of a few tenths of a percent, up to a few percent, say 3%. Also, the procedure has been described thoroughly in Part 2, immediately following the instant part. Table I gives the initial amine, the molecular weight, the amount of ethylene oxide added, amount of propylene oxide added, or glycide added. The moles of alkylene oxide added per mole of amine are noted in the table. The molecular weights of the monomers are noted.

In the heat polymerization of hydroxylated polyamines, there is no way of stopping the reaction at just a specific point, for instance, at the stage where the product is all dimer, or all trimer, or all tetramer. One could stop the reaction at a point that represents more or less a dimer, trimer or tetramer, based on a statistical average. Molecular weight determinations by the usual procedure (cryoscopic method) are not too satisfactory and the determination of amino or hydroxyl hydrogen atoms are not entirely satisfactory. The reactions, of course, are somewhat more complex than mere etherization, for a number of reasons, one being that actually rings may be formed, inner ethers may be formed, and possibly vinyl type compounds may be formed to a minor degree. For this reason, the molecular weights given in the table are just approximations, and similarly, the available reactive hydrogen atoms are noted, based on an approximate value obtained by analytical values, and also values which appear consistently with actual experiments. It has been pointed out previously that, although a single chemical compound may be used, the use of mixtures is perfectly satisfactory, and so long as there is obviously a plurality of reactive hydrogen atoms, four or more, the reagents are perfectly satisfactory for use for the present purpose. In some cases, as in the case of triethanolamine, no alkylene oxide is added, and in the case of the last compounds in the table, ethylene imine is used and the compound is not heat-polymerized further because it is unnecessary, since the resultant automatically meets the requirements indicated.

Similarly, one can increase the hydrophile effect by treatment with ethylene oxide.

It is obvious also that one might start with an amine that had only one reactive hydrogen atom and subject such an amine to reaction with a plurality of moles of glycide, so as to introduce

Table I

| Ex. No. | Amine or Glycol | Molecular Wt. | Oxide Added or Imine Added | Moles of Oxide or Imine Added | Molec. At. of Monomer | Approx. Degree of Polymerization | Approx. Molec. Wt. of Polymer | Approx. Number of Reactive Hydrogen Atoms |
|---|---|---|---|---|---|---|---|---|
| 1a | Triethylene tetramine | 146 | ETO | 4 | 322 | 2 | 600 | 8-10 |
| 2a | ----do---- | 146 | ETO | 4 | 322 | 3 | 850 | 13-15 |
| 3a | ----do---- | 146 | ETO | 4 | 322 | 4 | 1,000-1,200 | 16-20 |
| 4a | ----do---- | 146 | ETO and glycide | 2 and 2 | 382 | 2½ | 1,000 | 11-15 |
| 5a | ----do---- | 146 | ----do---- | 2 and 2 | 382 | 3½ | 1,200-1,500 | 17-22 |
| 6a | Diethylene triamine | 103 | ETO | 5 | 279 | 2½ | 750 | 10-11 |
| 7a | ----do---- | 103 | PRO | 5 | 279 | 2½ | 750 | 10-11 |
| 8a | ----do---- | 103 | ETO and glycide | 3 and 2 | 279 | 3½ | 1,000 | 15-18 |
| 9a | Propylene diamine | 74 | ETO | 4 | 250 | 2 | 470 | 5-6 |
| 10a | ----do---- | 74 | ETO and glycide | 4 and 1 | 324 | 3 | 900 | 10-12 |
| 11a | ----do---- | 74 | PRO | 4 | 406 | 3 | 1,100-1,200 | 6-8 |
| 12a | ----do---- | 74 | ETO and glycide | 4 and 2 | 554 | 3 | 1,400-1,550 | 12-15 |
| 13a | Tetraethylene pentamine | 189 | ETO | 5 | 409 | 2 | 750 | 11-13 |
| 14a | ----do---- | 189 | ETO | 5 | 409 | 3 | 1,100-1,175 | 15-17 |
| 15a | ----do---- | 189 | PRO | 5 | 479 | 2 | 900 | 11-13 |
| 16a | ----do---- | 189 | PRO and glycide | 3 and 2 | 511 | 3 | 1,400-1,500 | 20-22 |
| 17a | ----do---- | 189 | ETO and glycide | 3 and 2 | 511 | 3 | 1,400-1,500 | 20-22 |
| 18a | Triethanolamine | 149 | | | 149 | 2½ | 400 | 5-7 |
| 19a | ----do---- | 149 | ETO | 3 | 281 | 2½ | 550-600 | 5-7 |
| 20a | Triisopropanolamine | 191 | Glycide | 1 | 265 | 2½ | 550-600 | 9-11 |
| 21a | ----do---- | 191 | ----do---- | 3 | 413 | 3 | 1,000-1,150 | 13-15 |
| 22a | Diethylene Glycol | 106 | Ethylene imine | 2 | 192 | | Monomer 192 | 4 |
| 23a | Triethylene Glycol | 150 | ----do---- | 2 | 236 | | Monomer 236 | 4 |
| 24a | Dipropylene glycol | 134 | ----do---- | 2 | 220 | | Monomer 220 | 4 |
| 25a | Polyethylene glycol 200 | 200 | ----do---- | 2 | 286 | | Monomer 286 | 4 |
| 26a | Polyethylene glycol 300 | 300 | ----do---- | 2 | 386 | | Monomer 386 | 4 |
| 27a | Polyethylene glycol 400 | 400 | ----do---- | 2 | 486 | | Monomer 486 | 4 |
| 28a | Polypropylene glycol 190 | 190 | ----do---- | 2 | 276 | | Monomer 276 | 4 |
| 29a | Polypropylene glycol 250 | 250 | ----do---- | 2 | 336 | | Monomer 336 | 4 |
| 30a | Polypropylene glycol 310 | 310 | ----do---- | 2 | 396 | | Monomer 396 | 4 |

An examination of the typical polyamino ethers above, indicates the molecular weight may readily run to figures in the neighborhood of several thousand, particularly if there is further oxyalkylation with ethylene oxide, glycide or the like, before oxypropylation. The use of ethylene oxide or glycide, introduces increased hydrophile effect. Propylene oxide has the opposite effect, i. e., introduces more hydrophobe character in structures of the kind specified than hydrophile character.

Some of the molecular weights are in the neighborhood of 1500 or thereabouts. Actually, one can obtain polymers which have even greater molecular weights by the same sort of reaction; or, if desired, one can subject compounds such as Example 5a, 11a, or 16a to further treatment with glycide after the initial polymerization, and then repolymerize again. Using such procedure, one can obtain water-soluble polymers, or almost water-soluble polymers whose molecular weights range between 5,000 to 10,000. In such cases where the polymer, obtained by a secondary polymerization, is not completely water-soluble, it can be rendered water-soluble by further treatment with glycide. In the present invention the reactants subjected to oxypropylation are those which are water-soluble and have molecular weights under 10,000, but it does not exclude reactants where some additional hydrophile character has been introduced by use of ethylene oxide or glycide. For instance, one can increase the availability of reactive hydrogen atoms in compounds such as 24a through 30a, by merely treating the ethylene imine derivative with glycide, as an after-treatment.

a plurality of reactive hydrogen atoms. Actually, one can employ an amine, such as N,N'-dimethyltriglycoldiamine,

CH₃NHCH₂CH₂—O—CH₂CH₂—

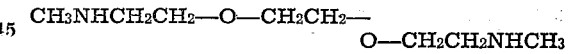

O—CH₂CH₂NHCH₃ and subject such amine to reaction with two moles of glycide, so as to obtain a suitable reactant, as far as plurality of reactive hydrogen atoms is concerned, for use in the instant invention.

It is also obvious that one can make minor variations without detracting from the spirit of the invention, provided the initial reactant meets the requirements specified, for instance, one might introduce an acyl radical from acetic acid or some other low molal monocarboxy acid or an imidazoline radical from such an acid. Furthermore, in the preparation of the initial reactant, one might use some other suitable alkylene oxide, such as 1-methyl-2,3-epoxypropane, 1-ethyl-2,3-epoxypropane or 1-propyl-2,3-epoxypropane.

The treatment of the initial reactant or raw materials with an alkylene oxide, or with ethylene imine, so as to render it particularly suitable as a reactant for oxypropylation, is similar to the usual oxypropylation step with certain variations. For convenience, the entire series of procedures are described in Part 2, immediately following.

PART 2

As I have pointed out previously, a variety of amines are available on the open market, or can be converted readily into suitable reactants by use of glycide, ethylene oxide, ethylene imine, or a combination of such reactants, particularly when followed by conventional heat polymerization, etc. Subsequently, the description is concerned largely with compounds obtained by the oxypropylation with typical polyamino reactants, such as those exemplified by Examples 1a to 30a, exclusive. However, the oxypropylation procedure is as simple as or more simple than oxyethylation, for the reason that it is somewhat less hazardous. On the other hand, the use of glycide or ethylene imine involves a greater hazard than ethylene oxide, and for this particular reason, considerable data are included in regard to the use of these reactants in addition to the use of propylene oxide.

I particularly call attention to the treatment of amines with glycide to yield valuable derivatives. The reaction between these amines, since they are basic, and glycide, presents no problem except the hazard involved in the reaction which takes place rapidly and possibly with violence, if not controlled. Needless to say, no catalyst need be added, and, in fact, none should be added. Indeed, this applies also to the early stages of oxypropylation of the derivatives obtained by glycide. Ultimately, the basicity is so reduced that catalysts must be added as illustrated in Tables III to VIII, which appear in the subsequent text.

Attention is directed to the fact that the use of glycide requires extreme caution. This is particularly true on any scale other than small laboratory or semi-pilot plant operations. Purely from the standpoint of safety in the handling of glycide, attention is directed to the following:

(a) If prepared from glycerol monochlorohydrin, this product should be comparatively pure;

(b) The glycide itself should be as pure as possible, as the effects of impurities are difficult to evaluate;

(c) The glycide should be introduced carefully, and precaution should be taken that it reacts as promptly as introduced, i. e., that no excess of glycide allowed to accumulate;

(d) All necessary precaution should be taken that glycide cannot polymerize per se;

(e) Due to the high boiling point of glycide, one can readily employ a typical separable glass resin pot, as described in the co-pending application of Melvin De Groote and Bernhard Keiser, Serial No. 82,704, filed March 21, 1949, (now Patent No. 2,499,370, dated March 7, 1950) and offered for sale by numerous laboratory supply houses.

If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced, it means that conventional stirrer of the paddle type is changed into the centrifugal type, which causes the fluid or reactants to mix, due to swirling action in the center of the pot. Still better, is the use of a laboratory autoclave of the kind previously described in this part; but in any event, when the initial amount of glycide is added to a suitable reactant, such as a polyalkylene amine, the speed of reaction should be controlled by the usual factors, such as (a) The rate of addition of glycide;

(b) The elimination of external heat; and (c) Use of cooling coil, so there is no undue rise in temperature.

All the foregoing is merely conventional, but is included, due to the hazard in handling glycide.

In actual practice, I have found it feasible to use the same laboratory autoclave for treatment with glycide, as used in oxypropylation, as described subsequently. In using this piece of equipment for glycide reactions, one need not be concerned with the fact that the equipment will stand pressure; but it is a convenient piece of apparatus when only two changes are made:

(a) The bomb arrangement for addition of propylene oxide is closed, since glycide does not have to be added under pressure; and (b) A metal-to-glass connection is made so that glycide can be added from an ordinary separatory funnel directly into the metal autoclave.

Another change that is made is that a vent, which is ordinarily plugged off, is connected by a metal-to-glass connection with an ordinary water-cooled glass condenser. In other words, this condenser is left open so that glycide is added drop-wise, using the stirring equipment temperature control, water-cooling equipment, etc., of the autoclave. In essence, it becomes nothing more nor less than a convenient piece of equipment, on a somewhat larger scale, of the glass resin pot arrangement previously described.

All the precautions in regard to glycide apply also to ethylene imine, which is preferably handled in the same manner. Ethylene imine probably has all the usual hazards of glycide, with the additional hazard of probably being highly poisonous and more volatile. In any event, carefully conducted exploratory experiments should be made if one is in doubt, either as to the nature of the reactants, or the suitability of the equipment employed.

The oxypropylation procedure employed in the preparation of derivatives from glycide-treated reactants, or any other amino reactants, has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices, and openings, such as the variable stirrer operating at speeds from 50 R. P. M. to 500 R. P. M., thermometer well and thermocouple for mechanical thermometer; emptying outlet; pressure gauge; manual vent line; charge hole for initial reactants; at least one connection for conducting the incoming alkylene oxide, such as propylene oxide, to the bottom of the autoclave; along with suitable devices for both cooling and heating the autoclave, such as a cooling jacket, and preferably, coils in addition thereto; with the jacket so arranged that it is suitable for heating with steam or cooling with water, and further equipped with electrical heating devices. Such autoclaves are, of course, in essence, small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container, so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing, so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement, practically all oxypropylations became uniform, in that the reaction temperature could be held within a few degrees of any point selected in this particular range, for instance, in most cases, I have selected a point of approximately 160° to 165° C., as being particularly desirable and stayed within the range of 155° to 180° C. almost invariably. Some modest variations from these limits are mentioned in the subsequent text. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam, in order that the reaction procedures at or near the selected temperatures be maintained.

Inversely, if the reaction proceeded too fast, the amount of reactant being added, i. e., propylene oxide, was cut down or electrical heat was cut off, or steam was reduced, or if need be, cooling water was run through both the jacket and the cooling coil. All these operations, of course, are dependent upon the required number of conventional gauges, check valves, etc., and the entire equipment, as has been pointed out, is conventional, and, as far as I am aware, can be furnished by at least two firms who specialize in the manufacture of this kind of equipment. As an illustration of such oxypropylation procedure, the following examples are included:

In regard to ethylene imine, as previously stated, it should be handled with extreme care, due to its hazardous nature, and preferably, the entire reaction conducted in a hood or similar device to prevent escape of poisonous fumes. Actually, reactions of the kind described in the table and described in Part 1, can be conducted most conveniently if one has available autoclaves of more than one size, for instance, 3½ liters, 5 liters, and 7 liters. If, at any stage, the product subjected to oxyalkylation, or the equivalent, is too thick to handle at the temperature selected, one can add any suitable solvent which is not susceptible to reaction with ethylene oxide or the like. Such solvents include xylene, decalin, diethylether of ethylene glycol or diethylether of diethylene glycol, etc. If any such solvent is added, it can be removed from the reaction product as soon as the reaction mass is rendered liquid by reaction with a suitable oxide, or the solvent can be permitted to stay in the final product, because its presence would be unobjectionable. If it is desirable to remove it distillation, particularly vacuum distillation, can be employed.

EXAMPLE 17b (This particular example is selected for convenience only. Examples 1b, 2b, etc., appear in Table II, subsequently.) The reaction vessel employed was a stainless steel autoclave, with the usual devices for heating, heat control, stirrer, inlet, outlet, etc., which is conventional in this type of apparatus. The capacity was approximately 3½ liters. The stirrer operated at a speed of approximately 300 R. P. M. The initial reactant was the product described as Example 17a in Part 1. It was obtained by reacting one mole of tetraethylene pentamine with 3 moles of ethylene oxide and 2 moles of glycide. No alkaline catalyst was added during the reaction. This product was then heat-polymerized in the manner described in the two aforementioned De Groote and De Groote et al. patents, Nos. 2,324,488 and 2,395,400. The product was polymerized so as to form a trimer having molecular weight in the neighborhood of 1400 to 1500. One-half of 1% of caustic soda was used during polymerization. This is the conventional type of catalyst employed.

There were charged into the autoclave 725 grams of product Example 17a, previously described. No solvent was added, since this material was sufficiently fluid at the temperature of reaction and also because the propylene oxide added, either immediately renders the product fluid or acts as a solvent temporarily to give substantially the same effect. No sodium methylate was added. The autoclave was sealed, swept with nitrogen gas and stirring started immediately and heat applied, and the temperature allowed to rise to approximately 150° C.–160° C. The bomb reservoir which served as a holder for propylene oxide was charged with 1500 grams of proylene oxide so that 1160 grams could be withdrawn by difference and noted on a suitable scale.

Before starting the operation, a range of 150° C. to 180° C. was selected as a suitable operating temperature. Subsequent control of valves, reaction inlet, cooling water, etc., was maintained to keep the reaction within this range. At 150° C.–160° C. the addition of propylene oxide was started by use of nitrogen pressure on the reservoir bomb which held propylene oxide. The pressure during the initial stage of the reaction of the propylene oxide, stayed comparatively low, for the reason that it took place rather rapidly and there was no opportunity for unreacted propylene oxide to heat up and show pressure. Actual gauge pressure varied during this reaction from as low as 50 pounds in the early part up to somewhat less than 100 pounds.

The nitrogen pressure on the propylene oxide reservoir was 100 pounds which meant that, due to the conventional check arrangement, propylene oxide could not be forced into the autoclave for reaction, if at any time the pressure in the reactor moved above 100 pounds gauge pressure. In actual operation, 1160 grams of propylene oxide were added in approximately 45 minutes and the reaction was perfectly smooth. At no time did it get past the pre-selected maximum point of 180° C.

See the tabular data in regard to Example 17b in Table II. Note the further oxypropylation of the material in the table under heading of Example 47b; likewise, in Table IV under the heading of 77b, and in Table V, under the heading of 107b, and in Table VI under the heading of 137b. Note that further oxypropylations are described in Table VII under Example 167b and in Table VIII under the heading of Example 197b. It will be noted that additions of sodium methylate as catalyst were made in these subsequent oxypropylations. The catalyst is added in powdered form and the reaction stirred sufficiently at the predetermined temperature (150° C. or thereabouts) so as to give complete solution or distribution of the catalyst before starting to inject or introduce propylene oxide. In some of the subsequent stages where the alkalinity of the original reactant contributed comparatively little catalytic effect, and where the reaction was dependent upon the catalytic effect of sodium methylate, the operating conditions indicated pressure at times as high as 200 pounds per square inch in the autoclave, and a temperature as high as 190° C. Needless to say, with the check valve arrangement, as the pressure rose past 100° C., the injection of propylene oxide was automatically stopped and no more was added until the pressure definitely dropped below 100 lbs. per square inch again. The largest amount of propylene oxide added at any one stage was 2320 grams. See Table II. In a general way, a thousand grams of propylene oxide could be reacted in almost every instance in less than 1¾ hours, and at the most, in about 2 hours. In some instances, the amount of propylene oxide was comparatively small, for instance, 580 grams. See Tables VI and VII. This amount was added in approximately one-half hour. Throughout the entire series of reactions, the temperature of 150° to 180° C. was most desirable, and only rarely exceeded this upper limit by 10°–15°, i. e., just short of 200° C. Much of the reaction in the various stages took place under 100 pounds' pressure, and at times, as high as 150 to 200 pounds. In some instances, particularly towards the last, due to the large molecular size, there was some tendency for the reaction to slow down and it could be speeded up to some degree by using a somewhat larger amount of catalyst than is shown, for instance, adding a percent of catalyst based on amount of propylene oxide added, instead of ½%. Sometimes as much as 1.5 or even 2.5 could be conveniently employed. In other instances, it was sometimes desirable to operate the stirrers at somewhat higher speed, for instance, 350 to 400 R. P. M. The most desirable products for use as herein specified, particularly as demulsifiers, come when the material shows a molecular weight in excess of 5,000 and less than 30,000, for instance, 8,000 to 25,000. In practically every instance the molecular weight of 7,500 or more gave materials which were water-insoluble; the materials were water-insoluble at a molecular weight in the neighborhood of 5,000 or thereabouts.

In one of the tables following there are shown derivatives in which the molecular weights are in the neighborhood of 60,000. I have prepared derivatives using increased amounts of propylene oxide up to 100,000. Thus, the invention is concerned with water-insoluble oxypropylation derivatives of the kind specified having molecular weights from 5,000 to 100,000, with the preferred range of 5,000 to 30,000, and particularly within the range of 8,000 to 25,000. The initial raw materials—the materials subjected to oxypropylation—are water-soluble derivatives which are generally in the neighborhood of 1,500 to 2,000, but may run as high as 5,000, or even 10,000, as previously pointed out.

*Table II*

| Ex. No. | Prior Deriv. No. | Probable Molec. Wt. | Probable No. of Reactive Hydrogen Atoms per Molecule | Amt. Taken, grams | Sod. Meth. Added If any, grams | Propylene Oxide added, grams | Molal Ratio per Molecule Original Reactant | Molecular Wt. of Derivative |
|---|---|---|---|---|---|---|---|---|
| 1b | 1a | 600 | 9 | 600 | None | 1,160 | 20:1 | 1,760 |
| 2b | 2a | 850 | 14 | 425 | ---do------ | 1,160 | 40:1 | 3,170 |
| 3b | 3a | 1,100 | 18 | 550 | ---do------ | 1,160 | 40:1 | 3,420 |
| 4b | 4a | 1,000 | 13 | 500 | ---do------ | 1,160 | 40:1 | 3,320 |
| 5b | 5a | 1,350 | 20 | 675 | ---do------ | 1,160 | 40:1 | 3,670 |
| 6b | 6a | 750 | 10 | 375 | ---do------ | 1,160 | 40:1 | 3,070 |
| 7b | 7a | 750 | 10 | 375 | ---do------ | 1,160 | 40:1 | 3,070 |
| 8b | 8a | 1,000 | 16 | 500 | ---do------ | 1,160 | 40:1 | 3,320 |
| 9b | 9a | 470 | 6 | 470 | ---do------ | 1,160 | 20:1 | 1,630 |
| 10b | 10a | 900 | 11 | 450 | ---do------ | 1,160 | 40:1 | 3,220 |
| 11b | 11a | 1,150 | 7 | 575 | ---do------ | 1,160 | 40:1 | 3,470 |
| 12b | 12a | 1,475 | 14 | 740 | ---do------ | 1,160 | 40:1 | 3,795 |
| 13b | 13a | 750 | 12 | 375 | ---do------ | 1,160 | 40:1 | 3,070 |
| 14b | 14a | 1,150 | 16 | 575 | ---do------ | 1,160 | 40:1 | 3,470 |
| 15b | 15a | 900 | 12 | 450 | ---do------ | 1,160 | 40:1 | 3,220 |
| 16b | 16a | 1,450 | 21 | 725 | ---do------ | 1,160 | 40:1 | 3,770 |
| 17b | 17a | 1,450 | 21 | 725 | ---do------ | 1,160 | 40:1 | 3,770 |
| 18b | 18a | 400 | 6 | 400 | ---do------ | 1,160 | 20:1 | 1,560 |
| 19b | 19a | 575 | 6 | 575 | ---do------ | 1,160 | 20:1 | 1,735 |
| 20b | 20a | 575 | 10 | 575 | ---do------ | 1,160 | 20:1 | 1,735 |
| 21b | 21a | 1,075 | 14 | 540 | ---do------ | 1,160 | 40:1 | 3,395 |
| 22b | 22a | 192 | 4 | 192 | ---do------ | 1,160 | 20:1 | 1,352 |
| 23b | 23a | 236 | 4 | 236 | ---do------ | 1,160 | 20:1 | 1,396 |
| 24b | 24a | 220 | 4 | 220 | ---do------ | 1,160 | 20:1 | 1,380 |
| 25b | 25a | 286 | 4 | 286 | ---do------ | 1,160 | 20:1 | 1,446 |
| 26b | 26a | 386 | 4 | 386 | ---do------ | 1,160 | 20:1 | 1,546 |
| 27b | 27a | 486 | 4 | 486 | ---do------ | 1,160 | 20:1 | 1,646 |
| 28b | 28a | 276 | 4 | 276 | ---do------ | 1,160 | 20:1 | 1,436 |
| 29b | 29a | 336 | 4 | 336 | ---do------ | 1,160 | 20:1 | 1,496 |
| 30b | 30a | 396 | 4 | 396 | ---do------ | 1,160 | 20:1 | 1,556 |

Table III

| Ex. No. | Prior Deriv. No. | Probable Molec. Wt. | Probable No. of Reactive Hydrogen Atoms per Molecule | Amt. Taken, grams | Sod. Meth. Added If any, grams | Propylene Oxide added, grams | Molal Ratio per Molecule Original Reactant | Molecular Wt. of Derivative |
|---|---|---|---|---|---|---|---|---|
| 31b | 1b | 1,760 | 9 | 880 | 15 | 2,320 | 100 | 6,400 |
| 32b | 2b | 3,170 | 14 | 1,055 | 15 | 1,450 | 115 | 7,520 |
| 33b | 3b | 3,420 | 18 | 1,130 | 15 | 1,450 | 115 | 7,770 |
| 34b | 4b | 3,320 | 13 | 1,110 | 15 | 1,450 | 115 | 7,670 |
| 35b | 5b | 3,670 | 20 | 1,320 | 15 | 1,450 | 115 | 8,020 |
| 36b | 6b | 3,070 | 10 | 1,025 | 15 | 1,450 | 115 | 7,420 |
| 37b | 7b | 3,070 | 10 | 1,025 | 15 | 1,450 | 115 | 7,420 |
| 38b | 8b | 3,320 | 16 | 1,110 | 15 | 1,450 | 115 | 7,670 |
| 39b | 9b | 1,630 | 6 | 815 | 15 | 2,320 | 100 | 6,270 |
| 40b | 10b | 3,220 | 11 | 1,075 | 15 | 1,450 | 115 | 7,570 |
| 41b | 11b | 3,470 | 7 | 1,155 | 15 | 1,450 | 115 | 7,820 |
| 42b | 12b | 3,795 | 14 | 1,265 | 15 | 1,450 | 115 | 8,145 |
| 43b | 13b | 3,070 | 12 | 1,020 | 15 | 1,450 | 115 | 7,420 |
| 44b | 14b | 3,470 | 16 | 1,155 | 15 | 1,450 | 115 | 7,820 |
| 45b | 15b | 3,220 | 12 | 1,070 | 15 | 1,450 | 115 | 7,570 |
| 46b | 16b | 3,770 | 21 | 1,255 | 15 | 1,450 | 115 | 8,120 |
| 47b | 17b | 3,770 | 21 | 1,255 | 15 | 1,450 | 115 | 8,120 |
| 48b | 18b | 1,560 | 6 | 780 | 15 | 2,320 | 100 | 6,180 |
| 49b | 19b | 1,735 | 6 | 865 | 15 | 2,320 | 100 | 6,355 |
| 50b | 20b | 1,735 | 10 | 865 | 15 | 2,320 | 100 | 6,355 |
| 51b | 21b | 3,395 | 14 | 1,130 | 15 | 1,450 | 115 | 7,745 |
| 52b | 22b | 1,352 | 4 | 675 | 15 | 2,320 | 100 | 5,972 |
| 53b | 23b | 1,396 | 4 | 700 | 15 | 2,320 | 100 | 6,016 |
| 54b | 24b | 1,380 | 4 | 680 | 15 | 2,320 | 100 | 6,000 |
| 55b | 25b | 1,446 | 4 | 725 | 15 | 2,320 | 100 | 6,066 |
| 56b | 26b | 1,546 | 4 | 775 | 15 | 2,320 | 100 | 6,166 |
| 57b | 27b | 1,646 | 4 | 825 | 15 | 2,320 | 100 | 6,266 |
| 58b | 27b | 1,436 | 4 | 720 | 15 | 2,320 | 100 | 6,056 |
| 59b | 29b | 1,496 | 4 | 750 | 15 | 2,320 | 100 | 6,116 |
| 60b | 30b | 1,556 | 4 | 775 | 15 | 2,320 | 100 | 6,176 |

Table IV

| Ex. No. | Prior Deriv. No. | Probable Molec. Wt. | Probable No. of Reactive Hydrogen Atoms per Molecule | Amt. taken, gms. | Sod. Meth. added if any, gms. | Propylene Oxide added, gms. | Molal Ratio per molecule original Reactant | Molec. Wt. Derivative | Water Soluble |
|---|---|---|---|---|---|---|---|---|---|
| 61b | 31b | 6,400 | 9 | 1,065 | 5 | 965 | 200 | 12,200 | No |
| 62b | 32b | 7,520 | 14 | 1,260 | 5 | 965 | 215 | 13,320 | No |
| 63b | 33b | 7,770 | 18 | 1,295 | 5 | 965 | 215 | 13,570 | No |
| 64b | 34b | 7,670 | 13 | 1,280 | 5 | 965 | 215 | 13,470 | No |
| 65b | 35b | 8,020 | 20 | 1,335 | 5 | 965 | 215 | 13,820 | No |
| 66b | 36b | 7,420 | 10 | 1,235 | 5 | 965 | 215 | 13,220 | No |
| 67b | 37b | 7,420 | 10 | 1,235 | 5 | 965 | 215 | 13,220 | No |
| 68b | 38b | 7,670 | 16 | 1,280 | 5 | 965 | 215 | 13,470 | No |
| 69b | 39b | 6,270 | 16 | 1,045 | 5 | 965 | 200 | 12,070 | No |
| 70b | 40b | 7,570 | 11 | 1,265 | 5 | 965 | 215 | 13,370 | No |
| 71b | 41b | 7,820 | 7 | 1,300 | 5 | 965 | 215 | 13,620 | No |
| 72b | 42b | 8,145 | 14 | 1,355 | 5 | 965 | 215 | 13,945 | No |
| 73b | 43b | 7,420 | 12 | 1,235 | 5 | 965 | 215 | 13,220 | No |
| 74b | 44b | 7,820 | 16 | 1,300 | 5 | 965 | 215 | 13,620 | No |
| 75b | 45b | 7,570 | 12 | 1,265 | 5 | 965 | 215 | 13,370 | No |
| 76b | 46b | 8,120 | 21 | 1,355 | 5 | 965 | 215 | 13,920 | No |
| 77b | 47b | 8,120 | 21 | 1,355 | 5 | 965 | 215 | 13,920 | No |
| 78b | 48b | 6,180 | 6 | 1,030 | 5 | 965 | 200 | 11,980 | No |
| 79b | 49b | 6,355 | 6 | 1,060 | 5 | 965 | 200 | 12,155 | No |
| 80b | 50b | 6,355 | 10 | 1,060 | 5 | 965 | 200 | 12,155 | No |
| 81b | 51b | 7,745 | 14 | 1,290 | 5 | 965 | 200 | 13,545 | No |
| 82b | 52b | 5,972 | 4 | 1,000 | 5 | 965 | 200 | 11,772 | No |
| 83b | 53b | 6,016 | 4 | 1,000 | 5 | 965 | 200 | 11,816 | No |
| 84b | 54b | 6,000 | 4 | 1,000 | 5 | 965 | 200 | 11,800 | No |
| 85b | 55b | 6,166 | 4 | 1,030 | 5 | 965 | 200 | 11,866 | No |
| 86b | 56b | 6,266 | 4 | 1,045 | 5 | 965 | 200 | 11,966 | No |
| 87b | 57b | 6,056 | 4 | 1,045 | 5 | 965 | 200 | 12,066 | No |
| 88b | 58b | 6,056 | 4 | 1,045 | 5 | 965 | 200 | 11,856 | No |
| 89b | 59b | 6,116 | 4 | 1,020 | 5 | 965 | 200 | 11,916 | No |
| 90b | 60b | 6,176 | 4 | 1,030 | 5 | 965 | 200 | 11,976 | No |

Table V

| Ex. No. | Prior Deriv. No. | Probable Molec. Wt. | Probable No. of Reactive Hydrogen Atoms per Molecule | Amt. taken, gms. | Sod. Meth. added if any, gms. | Propylene Oxide added, gms. | Molal Ratio per molecule original Reactant | Molec. Wt. Derivative | Water Soluble |
|---|---|---|---|---|---|---|---|---|---|
| 91b | 61b | 12,200 | 9 | 2,030 | 5 | 965 | 300 | 18,000 | No |
| 92b | 62b | 13,300 | 14 | 2,220 | 5 | 965 | 315 | 19,100 | No |
| 93b | 63b | 13,600 | 18 | 2,260 | 5 | 965 | 315 | 19,400 | No |
| 94b | 64b | 13,500 | 13 | 2,250 | 5 | 965 | 315 | 19,300 | No |
| 95b | 65b | 13,800 | 20 | 2,300 | 5 | 965 | 315 | 19,600 | No |
| 96b | 66b | 13,200 | 10 | 2,200 | 5 | 965 | 315 | 19,000 | No |
| 97b | 67b | 13,200 | 10 | 2,200 | 5 | 965 | 315 | 19,000 | No |
| 98b | 68b | 13,500 | 16 | 2,250 | 5 | 965 | 315 | 19,300 | No |
| 99b | 69b | 12,100 | 16 | 2,000 | 5 | 965 | 300 | 17,900 | No |
| 100b | 70b | 13,400 | 11 | 2,230 | 5 | 965 | 315 | 19,200 | No |
| 101b | 71b | 13,600 | 7 | 2,265 | 5 | 965 | 315 | 19,400 | No |
| 102b | 72b | 14,000 | 14 | 2,320 | 5 | 965 | 315 | 19,700 | No |
| 103b | 73b | 13,200 | 12 | 2,200 | 5 | 965 | 315 | 19,000 | No |
| 104b | 74b | 13,600 | 16 | 2,265 | 5 | 965 | 315 | 19,400 | No |
| 105b | 75b | 13,400 | 12 | 2,230 | 5 | 965 | 315 | 19,200 | No |
| 106b | 76b | 13,900 | 21 | 2,320 | 5 | 965 | 315 | 19,700 | No |
| 107b | 77b | 13,900 | 21 | 2,320 | 5 | 965 | 315 | 19,700 | No |
| 108b | 78b | 12,000 | 6 | 1,995 | 5 | 965 | 300 | 17,800 | No |
| 109b | 79b | 12,200 | 6 | 2,025 | 5 | 965 | 300 | 18,000 | No |
| 110b | 80b | 12,200 | 10 | 2,025 | 5 | 965 | 300 | 18,000 | No |
| 111b | 81b | 13,500 | 14 | 2,255 | 5 | 965 | 300 | 19,300 | No |
| 112b | 82b | 11,800 | 4 | 1,965 | 5 | 965 | 300 | 17,600 | No |
| 113b | 83b | 11,800 | 4 | 1,965 | 5 | 965 | 300 | 17,600 | No |
| 114b | 84b | 11,800 | 4 | 1,965 | 5 | 965 | 300 | 17,600 | No |
| 115b | 85b | 11,900 | 4 | 1,995 | 5 | 965 | 300 | 17,700 | No |
| 116b | 86b | 12,000 | 4 | 2,010 | 5 | 965 | 300 | 17,800 | No |
| 117b | 87b | 12,100 | 4 | 2,010 | 5 | 965 | 300 | 17,900 | No |
| 118b | 88b | 11,900 | 4 | 2,010 | 5 | 965 | 300 | 17,700 | No |
| 119b | 89b | 11,900 | 4 | 1,985 | 5 | 965 | 300 | 17,700 | No |
| 120b | 90b | 12,000 | 4 | 1,995 | 5 | 965 | 300 | 17,800 | No |

Table VI

| Ex. No. | Prior Deriv. No. | Probable Molec. Wt. | Probable No. of Reactive Hydrogen Atoms per Molecule | Amt. taken, gms. | Sod. Meth. added if any, gms. | Propylene Oxide added, gms. | Molal Ratio per molecule original Reactant | Molec. Wt. Derivative | Water Soluble |
|---|---|---|---|---|---|---|---|---|---|
| 121b | 91b | 18,000 | 9 | 1,800 | 4 | 580 | 400 | 23,800 | No |
| 122b | 92b | 19,000 | 14 | 1,910 | 4 | 580 | 415 | 24,900 | No |
| 123b | 93b | 19,400 | 18 | 1,940 | 4 | 580 | 415 | 25,200 | No |
| 124b | 94b | 19,300 | 13 | 1,930 | 4 | 580 | 415 | 25,100 | No |
| 125b | 95b | 19,600 | 20 | 1,960 | 4 | 580 | 415 | 25,400 | No |
| 126b | 96b | 19,600 | 10 | 1,960 | 4 | 580 | 415 | 25,800 | No |
| 127b | 97b | 19,600 | 10 | 1,960 | 4 | 580 | 415 | 24,800 | No |
| 128b | 98b | 19,300 | 16 | 1,930 | 4 | 580 | 415 | 25,100 | No |
| 129b | 99b | 17,900 | 16 | 1,790 | 4 | 580 | 400 | 23,700 | No |
| 130b | 100b | 19,200 | 11 | 1,920 | 4 | 580 | 415 | 25,000 | No |
| 131b | 101b | 19,400 | 7 | 1,940 | 4 | 580 | 415 | 25,200 | No |
| 132b | 102b | 19,700 | 14 | 1,970 | 4 | 580 | 415 | 25,500 | No |
| 133b | 103b | 19,000 | 12 | 1,900 | 4 | 580 | 415 | 24,800 | No |
| 134b | 104b | 19,400 | 16 | 1,940 | 4 | 580 | 415 | 25,200 | No |
| 135b | 105b | 19,200 | 12 | 1,920 | 4 | 580 | 415 | 25,000 | No |
| 136b | 106b | 19,700 | 21 | 1,970 | 4 | 580 | 415 | 25,500 | No |
| 137b | 107b | 19,700 | 21 | 1,970 | 4 | 580 | 415 | 25,500 | No |
| 138b | 108b | 17,800 | 6 | 1,780 | 4 | 580 | 400 | 23,500 | No |
| 139b | 109b | 18,000 | 6 | 1,800 | 4 | 580 | 400 | 23,800 | No |
| 140b | 110b | 18,000 | 10 | 1,800 | 4 | 580 | 400 | 23,800 | No |
| 141b | 111b | 19,300 | 14 | 1,930 | 4 | 580 | 400 | 23,100 | No |
| 142b | 112b | 17,600 | 4 | 1,760 | 4 | 580 | 400 | 23,400 | No |
| 143b | 113b | 17,600 | 4 | 1,760 | 4 | 580 | 400 | 23,400 | No |
| 144b | 114b | 17,600 | 4 | 1,760 | 4 | 580 | 400 | 23,400 | No |
| 145b | 115b | 17,700 | 4 | 1,770 | 4 | 580 | 400 | 23,500 | No |
| 146b | 116b | 17,800 | 4 | 1,780 | 4 | 580 | 400 | 23,600 | No |
| 147b | 117b | 17,900 | 4 | 1,760 | 4 | 580 | 400 | 23,700 | No |
| 148b | 118b | 17,700 | 4 | 1,790 | 4 | 580 | 400 | 23,500 | No |
| 149b | 119b | 17,700 | 4 | 1,770 | 4 | 580 | 400 | 23,500 | No |
| 150b | 120b | 17,800 | 4 | 1,780 | 4 | 580 | 400 | 23,600 | No |

Table VII

| Ex. No. | Prior Deriv. No. | Probable Molec. Wt. | Probable No. of Reactive Hydrogen Atoms per Molecule | Amt. taken, gms. | Sod. Meth. added if any, gms. | Propylene Oxide added, gms. | Molal Ratio per molecule original Reactant | Molec. Wt. Derivative | Water Soluble |
|---|---|---|---|---|---|---|---|---|---|
| 151b | 121b | 23,800 | 9 | 2,380 | 5 | 580 | 500 | 29,600 | No |
| 152b | 122b | 24,900 | 14 | 2,490 | 5 | 580 | 515 | 30,700 | No |
| 153b | 123b | 25,200 | 18 | 2,520 | 5 | 580 | 515 | 31,000 | No |
| 154b | 124b | 25,100 | 13 | 2,510 | 5 | 580 | 515 | 30,900 | No |
| 155b | 125b | 25,400 | 20 | 2,540 | 5 | 580 | 515 | 31,200 | No |
| 156b | 126b | 25,800 | 10 | 2,580 | 5 | 580 | 515 | 31,600 | No |
| 157b | 127b | 24,800 | 10 | 2,480 | 5 | 580 | 515 | 31,600 | No |
| 158b | 128b | 25,100 | 16 | 2,510 | 5 | 580 | 515 | 30,900 | No |
| 159b | 129b | 23,700 | 16 | 2,370 | 5 | 580 | 500 | 29,500 | No |
| 160b | 130b | 25,000 | 11 | 2,500 | 5 | 580 | 515 | 30,800 | No |
| 161b | 131b | 25,200 | 7 | 2,520 | 5 | 580 | 515 | 31,000 | No |
| 162b | 132b | 25,500 | 14 | 2,550 | 5 | 580 | 515 | 31,300 | No |
| 163b | 133b | 24,800 | 12 | 2,480 | 5 | 580 | 515 | 30,600 | No |
| 164b | 134b | 25,200 | 16 | 2,520 | 5 | 580 | 515 | 31,000 | No |
| 165b | 135b | 25,000 | 12 | 2,500 | 5 | 580 | 515 | 30,800 | No |
| 166b | 136b | 25,500 | 21 | 2,550 | 5 | 580 | 515 | 31,300 | No |
| 167b | 137b | 25,500 | 21 | 2,550 | 5 | 580 | 515 | 31,300 | No |
| 168b | 138b | 25,500 | 6 | 2,550 | 5 | 580 | 500 | 29,300 | No |
| 169b | 139b | 23,800 | 6 | 2,380 | 5 | 580 | 500 | 29,600 | No |
| 170b | 140b | 23,800 | 10 | 2,380 | 5 | 580 | 500 | 29,600 | No |
| 171b | 141b | 25,100 | 14 | 2,510 | 5 | 580 | 500 | 30,800 | No |
| 172b | 142b | 23,400 | 4 | 2,340 | 5 | 580 | 500 | 29,200 | No |
| 173b | 143b | 23,400 | 4 | 2,340 | 5 | 580 | 500 | 29,200 | No |
| 174b | 144b | 23,400 | 4 | 2,340 | 5 | 580 | 500 | 29,200 | No |
| 175b | 145b | 23,500 | 4 | 2,340 | 5 | 580 | 500 | 29,300 | No |
| 176b | 146b | 23,600 | 4 | 2,360 | 5 | 580 | 500 | 29,400 | No |
| 177b | 147b | 23,700 | 4 | 2,370 | 5 | 580 | 500 | 29,500 | No |
| 178b | 148b | 23,500 | 4 | 2,350 | 5 | 580 | 500 | 29,300 | No |
| 179b | 149b | 23,500 | 4 | 2,350 | 5 | 580 | 500 | 29,300 | No |
| 180b | 150b | 23,600 | 4 | 2,360 | 5 | 580 | 500 | 29,400 | No |

Table VIII

| Ex. No. | Prior Deriv. No. | Probable Molec. Wt. | Probable No. of Reactive Hydrogen Atoms per Molecule | Amt. taken, gms. | Sod. Meth. added if any, gms. | Propylene Oxide added, gms. | Molal Ratio per molecule original Reactant | Molec. Wt. Derivative | Water Soluble |
|---|---|---|---|---|---|---|---|---|---|
| 181b | 151b | 29,600 | 9 | 1,480 | 15 | 1,450 | 1,000 | 59,000 | No |
| 182b | 152b | 30,700 | 14 | 1,535 | 15 | 1,450 | 1,015 | 60,100 | No |
| 183b | 153b | 31,000 | 18 | 1,550 | 15 | 1,450 | 1,015 | 60,400 | No |
| 184b | 154b | 30,900 | 13 | 1,545 | 15 | 1,450 | 1,015 | 60,300 | No |
| 185b | 155b | 31,200 | 20 | 1,560 | 15 | 1,450 | 1,015 | 60,600 | No |
| 186b | 156b | 31,600 | 10 | 1,580 | 15 | 1,450 | 1,015 | 61,000 | No |
| 187b | 157b | 31,600 | 10 | 1,580 | 15 | 1,450 | 1,015 | 61,000 | No |
| 188b | 158b | 30,900 | 16 | 1,545 | 15 | 1,450 | 1,015 | 60,300 | No |
| 189b | 159b | 29,500 | 16 | 1,475 | 15 | 1,450 | 1,000 | 58,900 | No |
| 190b | 160b | 30,800 | 11 | 1,540 | 15 | 1,450 | 1,015 | 60,200 | No |
| 191b | 161b | 31,000 | 7 | 1,550 | 15 | 1,450 | 1,015 | 60,400 | No |
| 192b | 162b | 31,300 | 14 | 1,565 | 15 | 1,450 | 1,015 | 60,700 | No |
| 193b | 163b | 30,600 | 12 | 1,530 | 15 | 1,450 | 1,015 | 60,000 | No |
| 194b | 164b | 31,000 | 16 | 1,550 | 15 | 1,450 | 1,015 | 60,400 | No |
| 195b | 165b | 30,800 | 12 | 1,540 | 15 | 1,450 | 1,015 | 60,200 | No |
| 196b | 166b | 31,300 | 21 | 1,565 | 15 | 1,450 | 1,015 | 60,700 | No |
| 197b | 167b | 31,300 | 21 | 1,565 | 15 | 1,450 | 1,015 | 60,700 | No |
| 198b | 168b | 29,300 | 6 | 1,465 | 15 | 1,450 | 1,000 | 58,700 | No |
| 199b | 169b | 29,600 | 6 | 1,480 | 15 | 1,450 | 1,000 | 59,000 | No |
| 200b | 170b | 29,600 | 10 | 1,480 | 15 | 1,450 | 1,000 | 59,000 | No |
| 201b | 171b | 30,900 | 14 | 1,545 | 15 | 1,450 | 1,000 | 60,300 | No |
| 202b | 172b | 29,200 | 4 | 1,460 | 15 | 1,450 | 1,000 | 58,600 | No |
| 203b | 173b | 29,200 | 4 | 1,460 | 15 | 1,450 | 1,000 | 58,600 | No |
| 204b | 174b | 29,200 | 4 | 1,460 | 15 | 1,450 | 1,000 | 58,600 | No |
| 205b | 175b | 29,300 | 4 | 1,465 | 15 | 1,450 | 1,000 | 58,700 | No |
| 206b | 176b | 29,400 | 4 | 1,470 | 15 | 1,450 | 1,000 | 58,800 | No |
| 207b | 177b | 29,500 | 4 | 1,475 | 15 | 1,450 | 1,000 | 58,900 | No |
| 208b | 178b | 29,300 | 4 | 1,465 | 15 | 1,450 | 1,000 | 58,700 | No |
| 209b | 179b | 29,300 | 4 | 1,465 | 15 | 1,450 | 1,000 | 58,720 | No |
| 210b | 180b | 29,400 | 5 | 1,470 | 15 | 1,450 | 1,000 | 58,800 | No |

It will be noted that sodium methylate or any other suitable catalyst, such as caustic soda or caustic potash, is used if required. The products obtained in these reactions are liquids varying from light cream color with a trace of amber, to dark amber products. The color seems to be determined by the final polyamine reactant and treatment with glycide and propylene oxide simply seems to dilute the color. The products, of course, can be bleached to practically waterwhite in the conventional manner, using either charcoal or a bleaching clay. However, for technical purposes, such as used in demulsifiers, such refinement is not necessary.

In order to illustrate why the herein specified compounds or products are cogeneric mixtures and not single chemical compounds, and why they must be described in terms of manufacture and molal ratio or percentage of reactants, reference is made to a monohydric alcohol or a secondary amine having a single reactive amino hydrogen atom. Needless to say, after the first mole of propylene oxide reacts with such amine, the amino hydrogen atom is replaced by an alkanol radical. Some of the simplest compounds herein described as initial reactants, are those which appear in Table I. In some instances, particularly in the final group of examples, there are present four reactive hydrogen atoms. Indeed, the hereto attached claims specify that there must be a minimum of at least four reactive hydrogen atoms. However, for sake of considering the variations possible, one need only consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for sake of convenience, may be indicated as $RO(C_2H_4O)_{30}H$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many, many times in the case of a tetrahydric compound and a hexahydric compound, or one having even a larger number of hydroxyls. This is particularly true when enough propylene oxide is added to give, at least on a statistical basis, assuming complete reaction, a compound having a molecular weight within the range previously specified.

Basically, the compounds herein described owe their peculiar properties to a number of factors previously enumerated, at least in part:

(a) Size of molecule;
(b) Shape of molecule as far as space configuration goes;
(c) Absence of a single hydrophobe group having as many as 8 uninterrupted carbon atoms in a single radical;
(d) Substantial insolubility in water;
(e) Solubility in xylene; and
(f) Such combination being obtained by the action of propylene oxide alone for all practical purposes.

Actually, it can be seen that certain variations could be made without detracting from the spirit of the invention, as, for example, one could start with one of the initial reactants described in Table I, which had more than four reactive hydrogen atoms, and acylate such derivative with a low molal monocarboxy acid, such as acetic acid. Such monoacylated, or, for that matter, polyacylated, derivative, provided it was still water-soluble, and provided that the acyl group did not contain 8 carbon atoms, still could be treated in the same way as the examples used for illustration.

The oxypropylation has been shown step-wise, and obviously, at some point in the oxypropylation one could introduce a modest amount of ethylene oxide or glycide, for instance, up to one mole for each reactive hydrogen atom. Such small addition of ethylene oxide or glycide, or both for that matter, would not change the solubility in xylene and lack of solubility in water, for the reason that each mole of ethylene oxide or glycide introduced there would probably be introduced two or three dozen moles, or maybe 100 moles, of propylene oxide. Such variation does not depart from the invention and is included within the expression "oxypropylation" for reasons which require no further explanation. Needless to say, I have pointed out also that other alkylene oxides could be used, such as 1-methyl-2,3-epoxypropane, 1-ethyl-2,3-epoxypropane or 1-propyl-2,3-epoxypropane, to interrupt the chain obtained by oxypropylation. For that matter, butylene oxide could be used. Such variation does not alter the basic concept of the invention in any manner whatsoever.

Basically, a water-soluble polyamine of the kind described is transformed into a high molal water-insoluble compound, and such solubility and change in molecular structure is brought about substantially by use of propylene oxide alone.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propy alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying porcedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 147b, with 15 parts by weight of xylene and 10 parts by weight of isopropyl alcohol, an excellent demulsifier is obtained. Selection of the solvent will vary, depending upon the solubility characteristics of the oxyalkylated product, and, of course, will be dictated in part by economic consideration, i. e., cost.

As noted above, the products herein described may be used not only in diluted form, but also may be used admixed with some other chemical demulsifier. For example, a mixture which exemplifies such combination is the following:

Oxyalkylated derivative, for example, the product of Example 147b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to secure by Letters Patent is:

1. A process for breaking petroleum emulsions of the water-in-oil type, characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 10,000 and at least a plurality of reactive hydrogen atoms; (c) the initial polyamino reactant must be water-soluble; (d) the oxypropylation end product must be water-insoluble; (e) the oxypropylation end product be within the molecular weight range of 5,000 to 100,000 on an average statistical basis; (f) the solubility characteristics of the oxypropylation end product in respect to water must be substantially the result of the oxypropylation step; (g) the ratio of propylene oxide per initial reactive hydrogen atom must be within the range of 5 to 125; (h) the initial polyamino reactant must represent not more than 20%, by weight, of the oxypropylation end product on a statistical basis; (i) the preceding provisos are based on the assumption of complete reaction involving the propylene oxide and initial polyamino reactant; (j) the polyamino reactant must contain at least one basic nitrogen atom; and (k) at least one carbon atom chain linking two nitrogen atoms is interrupted at least once by an oxygen atom.

2. A process for breaking petroleum emulsions of the water-in-oil type, characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 10,000 and at least a plurality of reactive hydrogen atoms; (c) the initial polyamino reactant must be water-soluble; (d) the oxypropylation end product must be water-insoluble; (e) the oxypropylation end product be within the molecular weight range of 5,000 to 100,000 on an average statistical basis; (f) the solubility characteristics of the oxypropylation end product in respect to water must be substantially the result of the oxypropylation step; (g) the ratio of propylene oxide per initial reactive hydrogen atom must be within the range of 5 to 125; (h) the initial polyamino reactant must represent not more than 20%, by weight, of the oxypropylation end product on a statistical basis; (i) the preceding provisos are based on the assumption of complete reaction involving the propylene oxide and initial polyamino reactant; (j) the polyamino reactant must contain at least a plurality of basic nitrogen atoms; and (k) at least one carbon atom chain linking two nitrogen atoms is interrupted at least once by an oxygen atom.

3. A process for breaking petroleum emulsions of the water-in-oil type, characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 10,000 and at least a plurality of reactive hydrogen atoms; (c) the initial polyamino reactant must be water-soluble; (d) the oxypropylation end product must be water-insoluble; (e) the oxypropylation end product be within the molecular weight range of 5,000 to 100,000 on an average statistical basis; (f) the solubility characteristics of the oxypropylation end product in respect to water must be substantially the result of the oxypropylation step; (g) the ratio of propylene oxide per initial reactive hydrogen atom must be within the range of 5 to 125; (h) the initial polyamino reactant must represent not more than 20%, by weight, of the oxypropylation end product on a statistical basis; (i) the preceding provisos are based on the assumption of complete reaction involving the propylene oxide and initial polyamino reactant; (j) the polyamino reactant must contain at least a plurality of basic nitrogen atoms; and (k) at least one carbon atom chain linking two nitrogen atoms is interrupted at least once by an oxygen atom.

4. The process of claim 3, with the proviso that the molecular weight of the oxypropylated derivative be within the range of 5,000 to 10,000.

5. The process of claim 3, with the proviso that the molecular weight of the oxypropylated derivative be within the range of 10,000 to 15,000.

6. The process of claim 3, with the proviso that the molecular weight of the oxypropylated derivative be within the range of 15,000 to 20,000.

7. The process of claim 3, with the proviso that the molecular weight of the oxypropylated derivative be within the range of 20,000 to 25,000.

8. The process of claim 3, with the proviso that the molecular weight of the oxypropylated derivative be within the range of 25,000 to 30,000.

MELVIN DE GROOTE.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,243,329 | De Groote et al. | May 27, 1941 |
| 2,262,358 | De Groote et al. | Nov. 11, 1941 |
| 2,262,736 | De Groote et al. | Nov. 11, 1941 |
| 2,262,743 | De Groote et al. | Nov. 11, 1941 |
| 2,290,154 | Blair | July 21, 1942 |